Patented Oct. 8, 1946

2,408,831

UNITED STATES PATENT OFFICE 2,408,831

STEROIDAL COMPOUNDS AND METHODS FOR OBTAINING THE SAME

Romeo B. Wagner, State College, Pa., assignor to Parke, Davis & Company, Detroit, Mich., a corporation of Michigan No Drawing. Application May 15, 1944, Serial No. 535,755

8 Claims. (Cl. 260—239.5)

1

This invention relates to the preparation of new pseudo-sapogenins from new steroidal sapogenins which are described in my copending application Serial No. 535,759, filed May 15, 1944. (See also J. Am. Chem. Soc. 65, 1199 (1943).) These compounds are valuable as intermediates for the preparation of hormones of the sex hormone type and particularly of the adrenal cortex hormone type since they are oxygenated at position 12 of the steriod nucleus.

The reaction by which steroidal sapogenins are isomerized to the pseudo-genins have been described in detail in the copending Patents Nos. 2,352,848 and 2,352,852, issued July 4, 1944. These also include proof of structure of the pseudo-genin side chain.

This invention relates to the preparation of pseudo-genins having the formula,

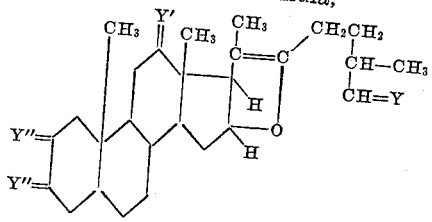

where Y and Y" are in each case members of the class

and groups hydrolyzable to

and Y' is a member of the class =O,

and groups hydrolyzable to

Specific examples of this type compound are pseudo-manogenin in which Y and the two Y" groups are each

at C-27, C-2 and C-3 of the nucleus, respectively,

2 and Y' at C-12 is =O. In pseudo-manogenin triacetate all three hydroxyls at C-27, C-2 and C-3 are acylated by acetyl groups. The same is true of pseudo-mexogenin and its triacylate or triacetate. However, pseudo-agavogenin forms a tetraacetate, since its group at C-12 is

The invention may be illustrated by the following examples.

Pseudomanogenin

A mixture of 10 g. of manogenin diacetate and 15 cc. of acetic anhydride contained in a sealed tube is heated at 200° C. for ten hours. The solvent is removed by distillation in vacuo and the residue crystallized from methanol as white needles of M. P. 168–171° C.; yield is 6 grams of pseudomanogenin triacetate.

Anal.: Calc'd. for $C_{33}H_{48}O_3$: C, 69.2; H, 8.5%. Found: C, 69.4; H, 8.3%.

Alkaline hydrolysis gives free pseudomanogenin from the triacetate.

Pseudomexogenin

A solution of 5 g. of mexogenin in 15 cc. of acetic anhydride is heated at 200° C. for 12 hours in a sealed tube. The solvent is removed and the residue is hydrolyzed with 200 cc. of boiling 5% alcoholic potassium hydroxide for 30 minutes. The hydrolysis mixture is extracted with ether and the ethereal solution is washed and evaporated until crystals start to appear and is then cooled. The crystals are then separated and recrystallized from acetone, M. P. 143–145° C. Yield is 3 grams of pseudomexogenin.

Anal.: Calc'd. for $C_{27}H_{42}O_5$: C, 72.6; H, 9.5%. Found: C, 72.2; H, 9.4.

By starting with mexogenin diacetate or like lower fatty acid diacylate and treating as described above for manogenin diacetate, one can obtain pseudomexogenin triacylate or triacetate.

Agavogenin can be similarly treated either to obtain pseudoagavogenin or its tetraacylate.

While for ease of manipulation and economy the preferred isomerizing agent is acetic anhydride, other lower aliphatic acid anhydrides may also be used. The preferred temperature range lies between 190° and 200° C. although the reaction also takes place as low as 170° or as high as 230°. The example is intended as illustrative and the invention is not necessarily limited to the conditions and reactants therein cited.

In addition to using ethanolic KOH solution for hydrolyzing the acylated pseudogenin to the free genin, one can use any other suitable alkaline solution, for example one containing NaOH, K₂CO₃, KHCO₃, Na₂CO₃, NaHCO₃ or the like. If an alcohol is required to aid hydrolysis, this can be methanol or other lower aliphatic alcohol instead of ethanol.

The formulas for pseudomanogenin, pseudomexogenin and pseudoagavogenin described above are:

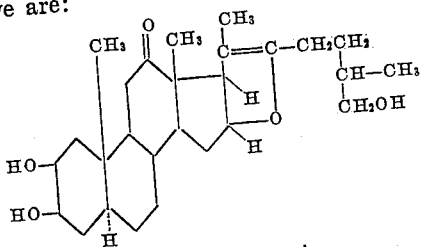

Pseudo-manogenin

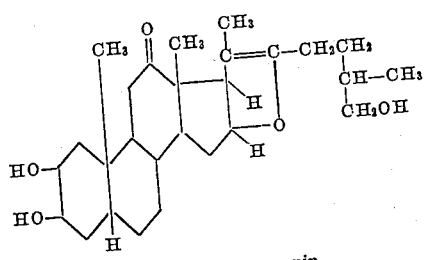

Pseudo-mexogenin

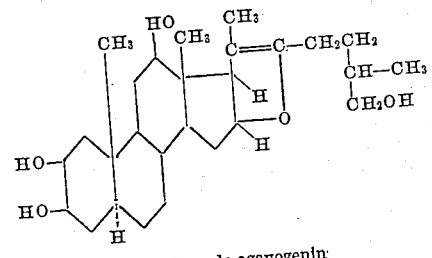

Pseudo-agavogenin

The acylates of these, such as the acetates, have the same formulas except that the OH groups are replaced by acyl or acetyl (CH₃COO).

What I claim is:
1. Compounds of the formula,

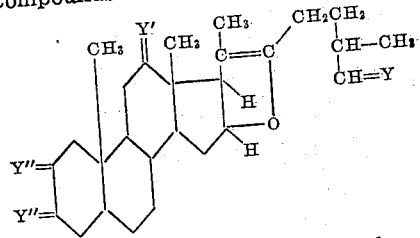

where Y and Y" are in each case members of the class

and groups hydrolyzable to

and Y' is a member of the class =O,

2. Compounds of the formula,

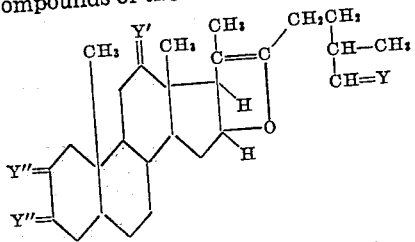

where Y and Y" are in each case members of the class

and lower carboxylic acid ester groups hydrolyzable to

and Y' is a member of the class =O,

and lower carboxylic acid ester groups hydrolyzable to

3. A pseudo-manogenin compound of the formula,

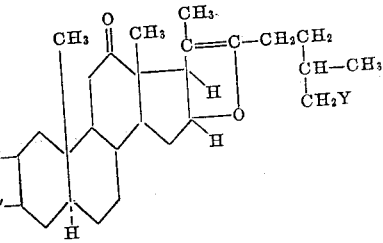

where Y and Y" are members of the class

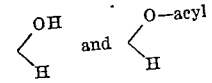

4. A pseudo-mexogenin compound having the formula,

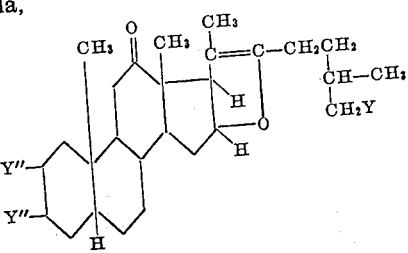

where Y and Y" are members of the class

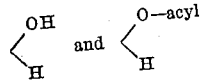

5. A pseudo-agavogenin compound having the formula,
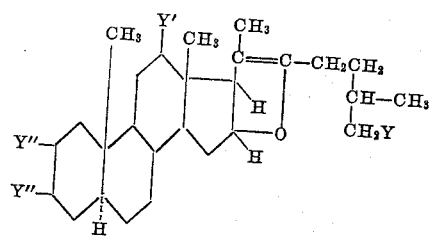
where Y, Y' and Y'' are members of the class
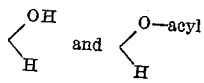
6. Pseudo-manogenin having the formula,
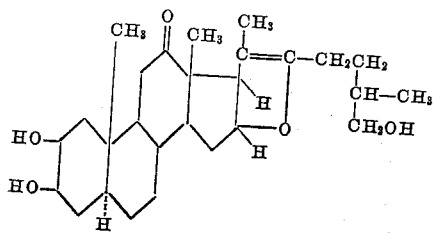
7. Pseudo-mexogenin having the formula,
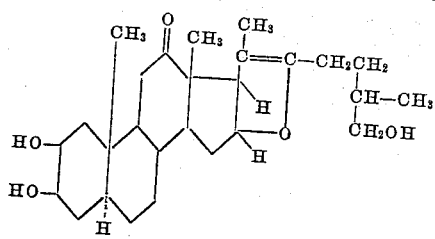
8. Pseudo-agavogenin having the formula,
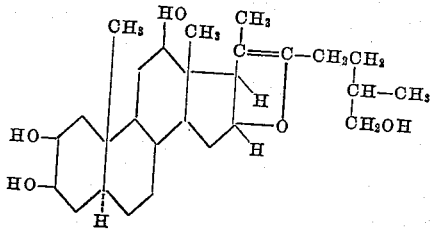
ROMEO B. WAGNER.